(12) United States Patent
Johri (10) Patent No.: US 7,295,510 B2
(45) Date of Patent: Nov. 13, 2007

(54) METHOD OF ESTIMATING RESTORATION CAPACITY IN A NETWORK

(75) Inventor: Pravin K. Johri, Aberdeen, NJ (US)

(73) Assignee: AT&T Corporation, Bedminster, NJ (US)

( * ) Notice: Subject to any disclaimer, the term of this patent is extended or adjusted under 35 U.S.C. 154(b) by 1053 days.

(21) Appl. No.: 10/321,082

(22) Filed: Dec. 17, 2002

(65) Prior Publication Data

US 2004/0114512 A1   Jun. 17, 2004

(51) Int. Cl.
  *G01R 31/08*   (2006.01)
(52) U.S. Cl. ...................................... 370/216; 370/225

(58) Field of Classification Search ............... None
See application file for complete search history.

(56) References Cited

U.S. PATENT DOCUMENTS

| 6,842,425 | B1 * | 1/2005 | Mannepalli et al. | 370/238 |
| 7,130,262 | B1 * | 10/2006 | Cortez et al. | 370/216 |
| 7,213,077 | B2 * | 5/2007 | Border | 709/234 |
| 2003/0095500 | A1 * | 5/2003 | Cao | 370/216 |

* cited by examiner

*Primary Examiner*—Robert W. Wilson
(74) *Attorney, Agent, or Firm*—Michael Haynes PLC; Michael N. Haynes; Dale R. Jensen (57) ABSTRACT

A method for estimating restoration capacity for a communication network includes a specified number of restoration paths, which can be maximally diverse from each other.

2 Claims, 8 Drawing Sheets

METHOD OF ESTIMATING RESTORATION CAPACITY IN A NETWORK

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to networks and, more particularly, to communication networks having restoration capability.

BACKGROUND OF THE INVENTION

Communication networks having some level of restoration capability to overcome failures and fiber cuts are well known in the art. One challenge with such networks is estimating the amount of restoration capacity needed which, in turn, requires a selection of restoration paths for all circuits. The choice of restoration paths balances the speed of restoration and the amount of restoration capacity deployed.

A failed circuit restores in the fastest amount of time if it finds sufficient capacity on the pre-stored protect path used by the switches. The protect path is typically the shortest path maximally diverse from the service path. If not, it has to crankback and repeatedly attempt to restore on newly calculated paths until one is successful. On the other hand, restoration capacity needs to be shared between unrelated failures or an excess amount of restoration capacity will be needed. Sharing may require that restoration paths other than the pre-stored protect path be used.

There are often multiple choices available for restoration paths for each circuit. In one known technique, the system allocates all capacity on the shortest maximally diverse path and essentially optimizes restoration performance at the expense of capacity. In another known technique, an integer programming formulation minimizes the amount of restoration capacity needed. This method essentially optimizes the cost of capacity and sacrifices restoration performance.

In addition, for any given service path, there can be numerous restoration paths available in the network. The system needs to select one of these multiple choices, and deal with the dimensionality explosion when there are hundreds of service paths. Thus, planning restoration capacity is challenging. Known methods can come up with widely varying estimates of restoration capacity and also propose capacity in different places in the network. The difficulty in estimating restoration capacity further increases if the network is evolving and new (better) restoration paths become available as more nodes and links are added.

It would, therefore, be desirable to overcome the aforesaid and other disadvantages.

SUMMARY OF THE INVENTION

The present invention provides a method for estimating restoration capacity in a communication network by selecting a desired number of restoration paths. With this arrangement, a user can efficiently estimate restoration capacity for the network. While the invention is primarily shown and described in conjunction with a network having interconnected switches, it is understood that the invention is applicable to networks in general, in which restoration is desirable.

In one aspect of the invention, a method of estimating restoration capacity includes identifying a circuit in the network and obtaining a desired number of restoration paths for the circuit. In one embodiment, a user is queried for the number of restoration paths. The restoration paths are then determined. In an exemplary embodiment, the restoration paths are maximally diverse from each other.

In another aspect of the invention, restoration capacity is apportioned among the restoration paths. In one embodiment, the user, via a query for example, assigns a percentage of the restoration capacity to each restoration path. The Dijkstra shortest path algorithm can be used to determine the restoration paths.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention provides a technique for estimating restoration capacity in a communication network. In general, the invention enables a user to select a predetermined number of restoration paths for one or more circuits. In an exemplary embodiment, the restoration paths are maximally diverse from each other. In one particular embodiment, the user can specify a restoration capacity for the circuits. With this arrangement, control of network planning and restoration is enhanced over known techniques for network restoration.

Figure 1:
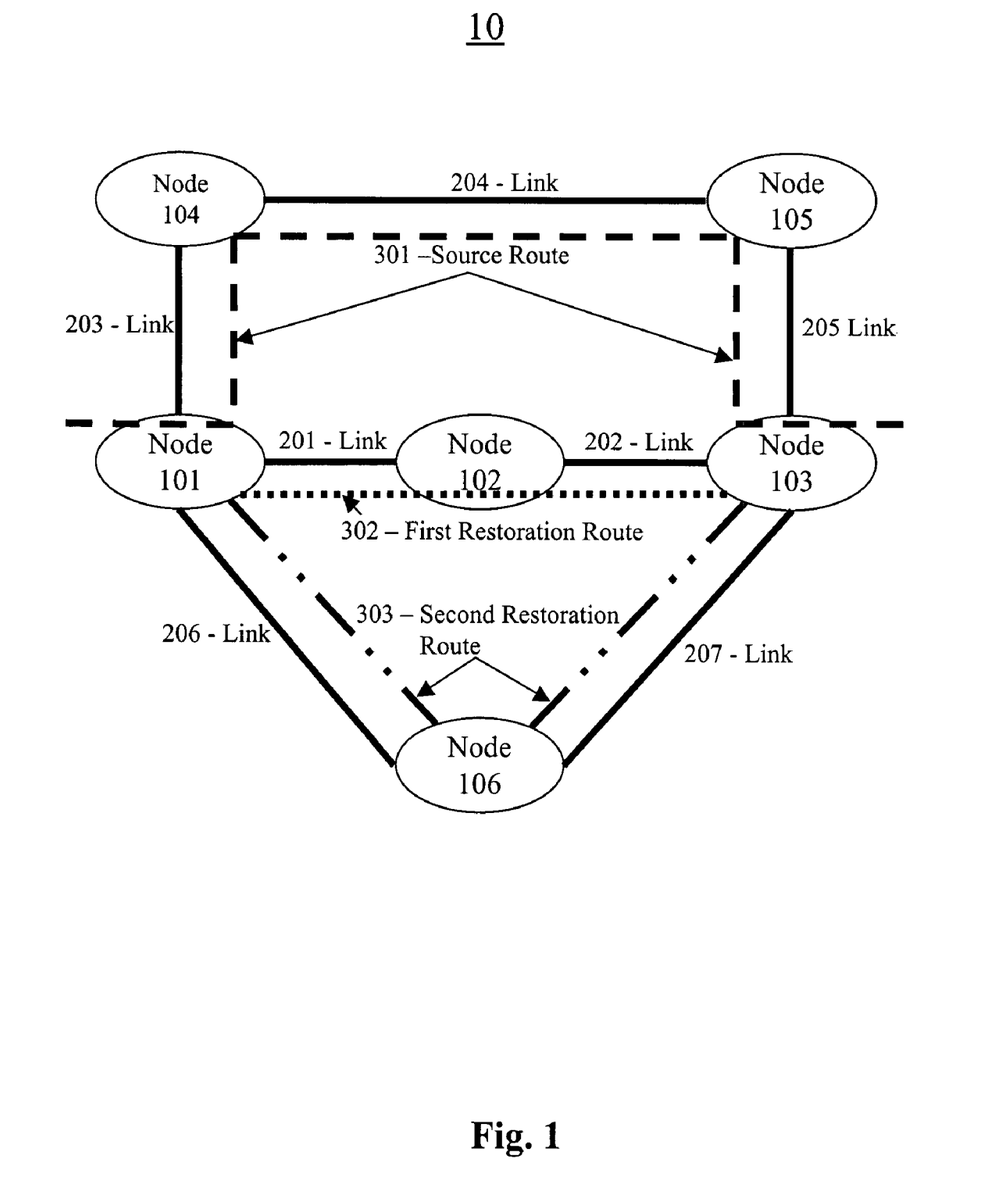
FIG. 1 is a schematic depiction of a network having estimated restoration capacity in accordance with the present invention.

Before describing the invention in detail, some introductory network restoration concepts are discussed below. Networks include a number of switches connected by communication links. There could be multiple links between a given pair of switches (only one is shown in FIG. 1 for simplicity) and not every pair of switches needs to be connected to each other. A link can include multiple lines (or wavelengths).

Lines could be of various sizes that are generally expressed in well known bandwidth units, such as DS3, OC3, OC12, OC48, etc. Again, for simplicity, the network can be described as if each link has just one OC48 line. Each link is bi-directional and has a number of parameters.

FIG. 1 shows an exemplary network 10 having estimated restoration capacity. It is understood that FIG. 1 is used to describe certain aspects of conventional network restoration as well as the inventive method for estimating restoration capacity described further below. The network 10 includes a series of nodes, e.g., switches, 101-106 interconnected by respective links 201-207 as shown. The network further includes a service route 301, a first restoration route 302, and a second restoration route 303. While the service route extends beyond the network to the customer sites at each end, the restoration routes are only for the portion of the service route between the end switches. This assumes that circuits are restored end-to-end. It is understood that the invention is applicable in a straightforward manner to cases where sections of the circuit are restored by intermediate switches.

Figure 2:
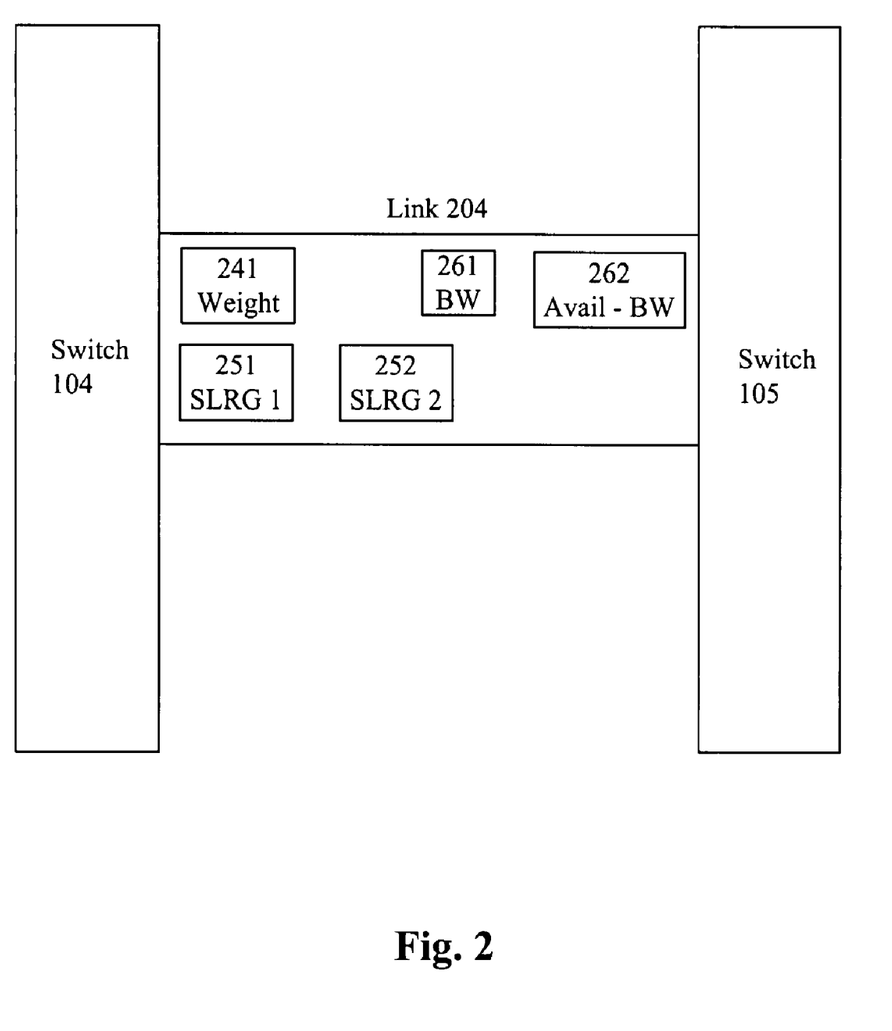
FIG. 2 is a schematic depiction showing further details of a link in the network of FIG. 1.

FIG. 2 shows further details of the link 204 between switches 104 and 105. A weighting parameter is the provisioned (administrative) weight 241 of the link 204. It is understood that there are two weights per link, one in each direction. Typically, the weights are set to the same value.

An ID parameter is a set of Shared Link Resource Group (SLRG) IDs 251, 252, . . . which are also known as Protection Bundle IDs or Fiber Span IDs. It is understood that there can be multiple SLRG IDs. The SLRG IDs 251, 252, . . . are used to indicate if links are diverse or not. As is known in the art, two links are diverse if the SLRG IDs of one link are all different from the SLRG IDs of the other link. If two links are diverse, a single fiber span failure cannot cause both links to fail. Diverse links are useful for calculating restoration paths.

A bandwidth parameter BW 261 contains the total bandwidth of the link and the available bandwidth parameter AW 262 contains the bandwidth currently available for new circuits. Thus the available bandwidth AW equals the total bandwidth BW minus the bandwidth used by existing circuits. Table 1 below shows exemplary link parameters, where each link equals one OC48 (48 STS1 slots) in this example.

TABLE 1

Link Parameters

| LINK | WEIGHT | SLRG IDs | BW | AW |
|------|--------|----------|----|----|
| 201 | 10 | 1 | 48 slots | 3 slots |
| 202 | 20 | 2, 8 | 48 slots | 24 slots |
| 203 | 10 | 3 | 48 slots | 7 slots |
| 204 | 15 | 4 | 48 slots | 5 slots |
| 205 | 20 | 5, 8 | 48 slots | 8 slots |
| 206 | 30 | 6, 8, 9 | 48 slots | 9 slots |
| 207 | 30 | 7 | 48 slots | 31 slots |

It is understood that the invention is applicable to a variety of circuit-based communication networks. Exemplary network types include optical switch and optical cross-connect networks, Asynchronous Transfer Mode (ATM) networks, Frame Relay networks, networks having Multi Protocol Label Switching (MPLS) enabled label-switched Internet Protocol (IP) routers, and networks having Lambda (optical wavelength) routers. In such networks, circuits are provisioned between pairs of switches and several classes of services can be carried on these circuits.

These types of networks use conventional Routing and Signaling protocols to automate a variety of functions, such as self-discovery of network resources, construction and maintenance of an identical link-state database of routing information across all switches (within an Area, Peer Group, etc.), automatic provisioning and restoration of circuits, determination of paths for provisioning and restoration of circuits, detection of network failure conditions, and flooding of information related to any change in the state of the network to the switches, including failures of switches and links, change in available bandwidth on a link, etc.

Illustrative Routing and Signaling protocols include Open Shortest Path First (OSPF), MPLS, Private Network-to-Network Interface (PNNI), etc. and variants of these standard protocols that have been adapted to specific networks or applications. These networks are characterized by the fact that the intelligence is distributed in every switch and is not centralized in one or more central locations. Typically, all switches run the same set of protocols although the functions performed by the switches may vary somewhat based on how switches are used. For example, border switches in an OSPF area have greater functionality than other switches. Thus, the switches, while employing the same or similar protocols, operate independently of each other. Any coordination of activities between switches is done by sending messages to each other in ways prescribed by the routing and signaling protocols.

A new circuit order between a pair of switches is provisioned in a known manner. One of the switches is selected as the source of this circuit and the other as the destination. The source switch calculates a path for the circuit using information collected by the Routing protocol. The information typically includes network topology, available network resources, etc. The path must have sufficient network resources to meet the quality of service requirements (bandwidth, delay, etc.) of the circuit.

The source switch then sets up the circuit using the signaling protocol. A setup message is sent out along the selected path of the circuit. Each switch in the path checks to see if the requested resources are available and then allocates the resources to the circuit. If all switches are able to allocate the resources then the setup succeeds. Otherwise the setup is flagged as a failure. An unsuccessful setup attempt may result in a so-called crankback to the source, which then tries to set up the circuit on a different path. The new path must also have sufficient resources to meet the needs of the circuit.

Typically, paths are generated using variants of the well-known Dijkstra's shortest path algorithm. The weight of a path is the sum of the weight of the links in the path. As is well known in the art, Dijkstra's algorithm seeks to find the path with the minimum weight. In many networks, it is likely that there are several paths with identical weights, particularly when there are several links between a given pair of nodes. Typically, many of these links may be assigned the same weight. Substituting one link for another results in paths with identical weight. Links with insufficient bandwidth are pruned from the network topology before the Dijkstra algorithm is run.

Conventional Dijkstra implementations select among equal weight links (and sometimes paths) in a fixed order. These implementations attempt to fill up the selected link before another link is selected in order to maximize filling of the links with circuits on them. The resulting effect is to leave the remaining links empty, and thus, capable of accepting large circuits.

Figure 3:
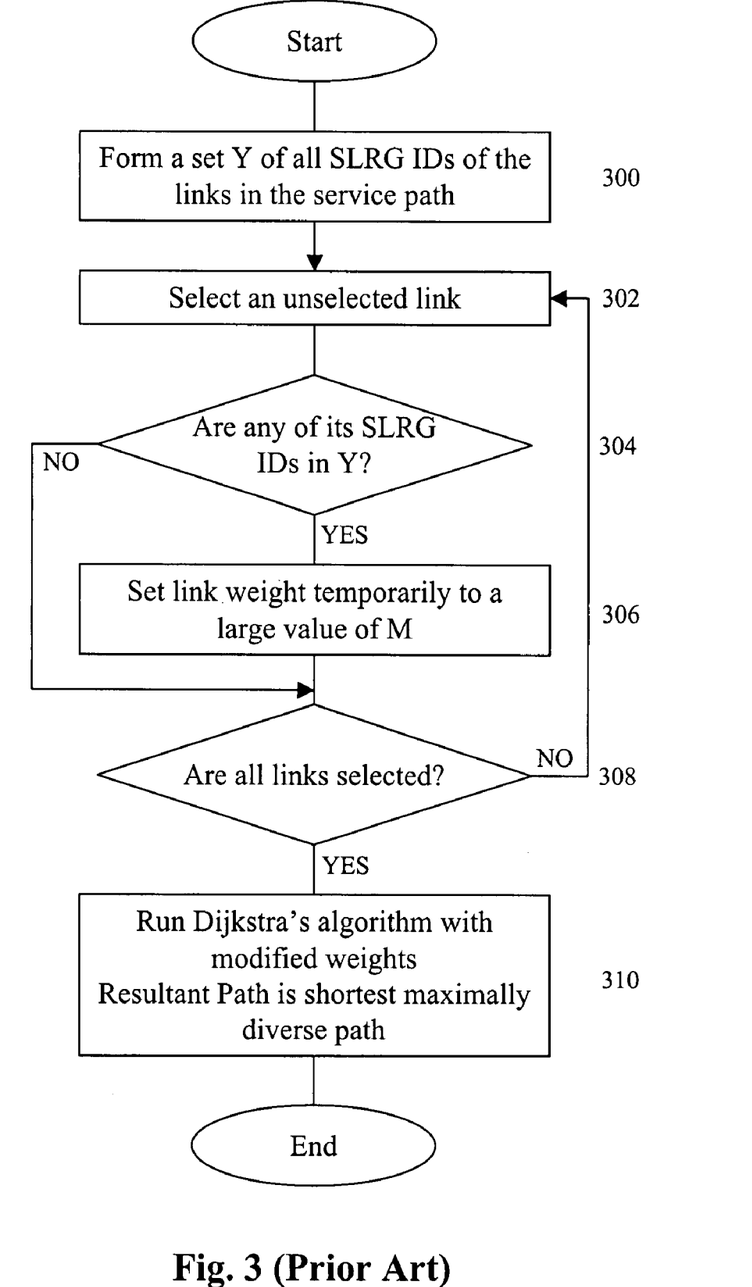
FIG. 3 is a flow diagram showing a prior art sequence of steps for determining the shortest maximally diverse path in a network.

FIG. 3 shows a prior art sequence of steps for calculating a shortest, maximally diverse path given the service path for a circuit. In step 300, a set Y is formed from all of the SLRG IDs of the links in the service path. An unselected link in the network is then selected in step 302. In step 304, it is determined whether any of the SLRG IDs for the selected link are contained in the set Y. If so, in step 306, the link weight is temporarily set to a large value M and processing continues in step 308. If not, in step 308 it is determined whether all the links are selected. If not, another link is selected in step 302. If so, then in step 310 Dijkstra's algorithm is run with modified weights to find the shortest maximally diverse path.

When there is a network failure, such as a fiber cut or switch failure, a number of circuits may be impacted. The switches adjacent to the failure first detect the failure condition, identify the circuits affected by it, and then initiate signaling messages releasing these circuits. For example, a release message travels back to the source and the destination of the circuit, releasing all resources held by the circuit along the way. The source switch then determines a new path and tries to establish the failed circuit on this new path. This is referred to as restoring the circuit. The new path must have sufficient resources to meet the needs of the circuit. It must also avoid the failed part of the network. Information about the failed part is disseminated by the Routing protocol, but there may be a short delay in getting this information. The release (crankback) message may also contain information regarding where the circuit (setup) failed.

Generally, the procedure used to restore the circuit is identical to the method used to provision it in the first place. Often, there are some variations. For example, some switches pre-calculate a restoration path for each circuit. Typically, the shortest path maximally diverse from the service path is used for this purpose. This path is attempted first whenever the circuit fails. If the setup attempt on this pre-calculated path fails, then the Dijkstra algorithm is run to obtain a new path, after the failed portions of the network are removed from the network topology.

Unsuccessful restoration attempts also result in crankbacks, and it is not unlikely that a circuit may crankback multiple times before it finally restores. Each crankback increases the amount of time the service associated with the circuit suffers an outage and it is desirable that the number of crankbacks be minimized. The failed circuits compete for the same available network resources during restoration. It is likely that there are insufficient network resources to restore all failed circuits. In this case, some of the circuits will not restore and remain in the failed state.

Often there are many types of services that comprise the various circuits. It is standard practice to release the failed circuits in a priority order based on the type of service, and also to initiate the re-establishment of circuits in a similar priority order. Thus, higher priority (premium) service circuits may be released first and then the lower priority (basic) service circuits are released. Similarly, at the source nodes of the released circuits, restoration may be attempted first for the premium class of circuits and then for the basic class of circuits.

Once the failure conditions clear in the network, the restored circuits may revert back to their original (service) paths from the restoration paths. This involves releasing the circuit on the restoration path and then setting it up on the original path. The switches typically maintain a record of the original path.

For successful restoration, particularly with large failure events, such as fiber cuts, there must be adequate spare (restoration) bandwidth in the network. Often a fiber cut takes out several links simultaneously. Consequently, the network may maintain many spare links worth of restoration capacity on potential restoration paths. Since failures can occur anywhere in the network, spare restoration capacity is maintained throughout the network.

In general, it is challenging to estimate how much restoration capacity is needed and where it should be deployed. This is because the intelligent switches perform capacity-constrained routing and are expected to restore a circuit if there is sufficient available capacity anywhere in the network. The exact restoration path taken depends on the size and location of the failure event and the amount of spare capacity in the network, and could be, for example, one of twenty or more choices available in a large network.

The service path of a circuit is typically the shortest path between the two end points (switches) of the circuit. The "farther" the restoration capacity is from the service path, in general, the longer it would take for the switch to find it. Here "farther" is a concept roughly defined in terms of number of other paths with a weight between the weights of the service path and the path on which capacity is deployed. Since many switches attempt the pre-calculated shortest maximally diverse path first during restoration, a known method to estimate restoration capacity is to allocate it on this type of path for each circuit.

Figure 4:
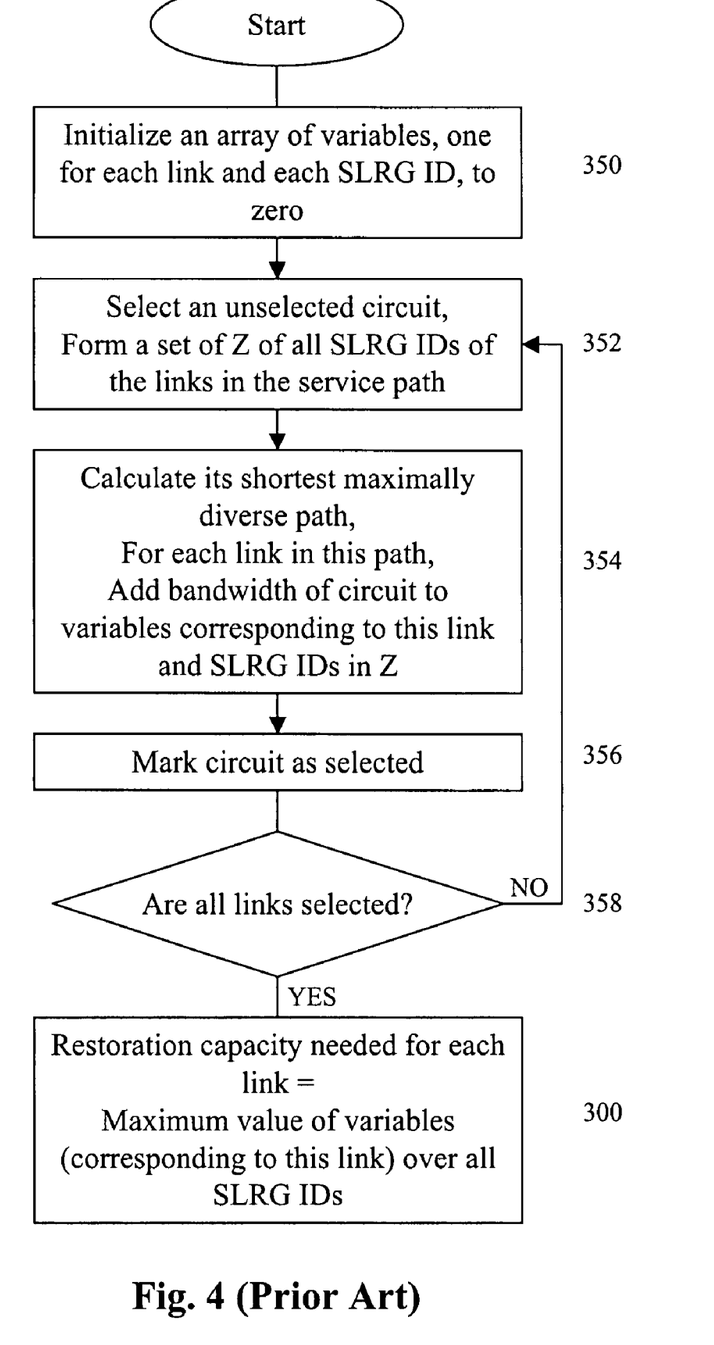
FIG. 4 is a flow diagram showing a prior sequence of steps for estimating restoration capacity.

FIG. 4 shows an exemplary prior art sequence of steps for estimating restoration capacity. In step 350, an array of variables is initialized is set to zero. In an exemplary embodiment, one dimension of the array corresponds to links in the network, and the other dimension corresponds to SLRG ID values used in the network. In step 352, an unselected circuit is selected from the set of circuits for which restoration capacity is to be estimated, and a set Z is formed including all SLRG IDs of the links in its service path. The shortest maximally diverse path is then calculated in step 354 so that for each link in the path the bandwidth of this circuit is added to variables in step 350 corresponding to the link and the SLRG IDs of the link. In step 356, the circuit is marked as selected and in step 358 it is determined whether all circuits are selected. If not, processing continues in step 352. If so, in step 360, the restoration capacity for each link is determined as the maximum value of variables corresponding to this link over all SLRG IDs.

Since the shortest (maximally diverse) path is used, the restoration capacity is "close" to the service path if this method is used. This method typically has good restoration performance but lands up allocating a relatively large amount of capacity. The restoration capacity needed for unrelated failure events (that is, without a common SLRG ID) could be shared, thereby requiring less overall restoration capacity in the network, but the amount of sharing can only be calculated once the restoration paths are determined. An integer programming-based problem formulation maximizes the sharing of restoration bandwidth but takes a relatively long time to solve. It often selects restoration paths "far" from the service path so that switches may take a longer amount of time to find it. The restoration performance of the network suggested by integer programming-based methods may be relatively poor and it is often the case that this network may not be fully restorable in reality. This is because the switches do independent computation of restoration paths and may not be able to replicate the restoration paths suggested by this (centralized) method. Analyses indicate that estimates produced by these methods could vary by 30% or more.

In general, the invention provides a method for calculating a user-specified number "n" of restoration paths for each circuit. These paths can be maximally diverse from each other. The user then specifies the percent of restoration capacity to be deployed on each of these paths. For example, for n=3 and percentages (60%, 30%, 10%), three restoration paths are calculated in accordance with the present invention. The first path is maximally diverse from the service path, the second path is maximally diverse from the service path and the first restoration path, and so on. In this example, 60% of the restoration capacity needed for this circuit is allocated to the first path, 30% to the second path, and 10% to the third. While the invention is described as if the same value of n and respective percentages is used for all circuits, it is understood that different values can be used for different sets, e.g., premium and basic, of circuits.

A larger value of n leads to more paths being used and more sharing of restoration capacity. It also results in longer restoration times, in general. As described below, this arrangement provides a user the ability to control restoration planning in a relatively straightforward manner.

In general, the inventive method for estimating restoration capacity uses multiple, maximally diverse restoration paths along with a weighted combination of the various paths. Parameters for this method include the number of restoration paths n to use and the percentage of capacity $p=(p_1, p_2, \ldots p_n)$ allocated to each path.

Initially, certain parameters are obtained for the restoration estimate. It is understood that the parameters can be obtained in a variety of ways including user queries, automatic selection, and the like.

Figure 5:
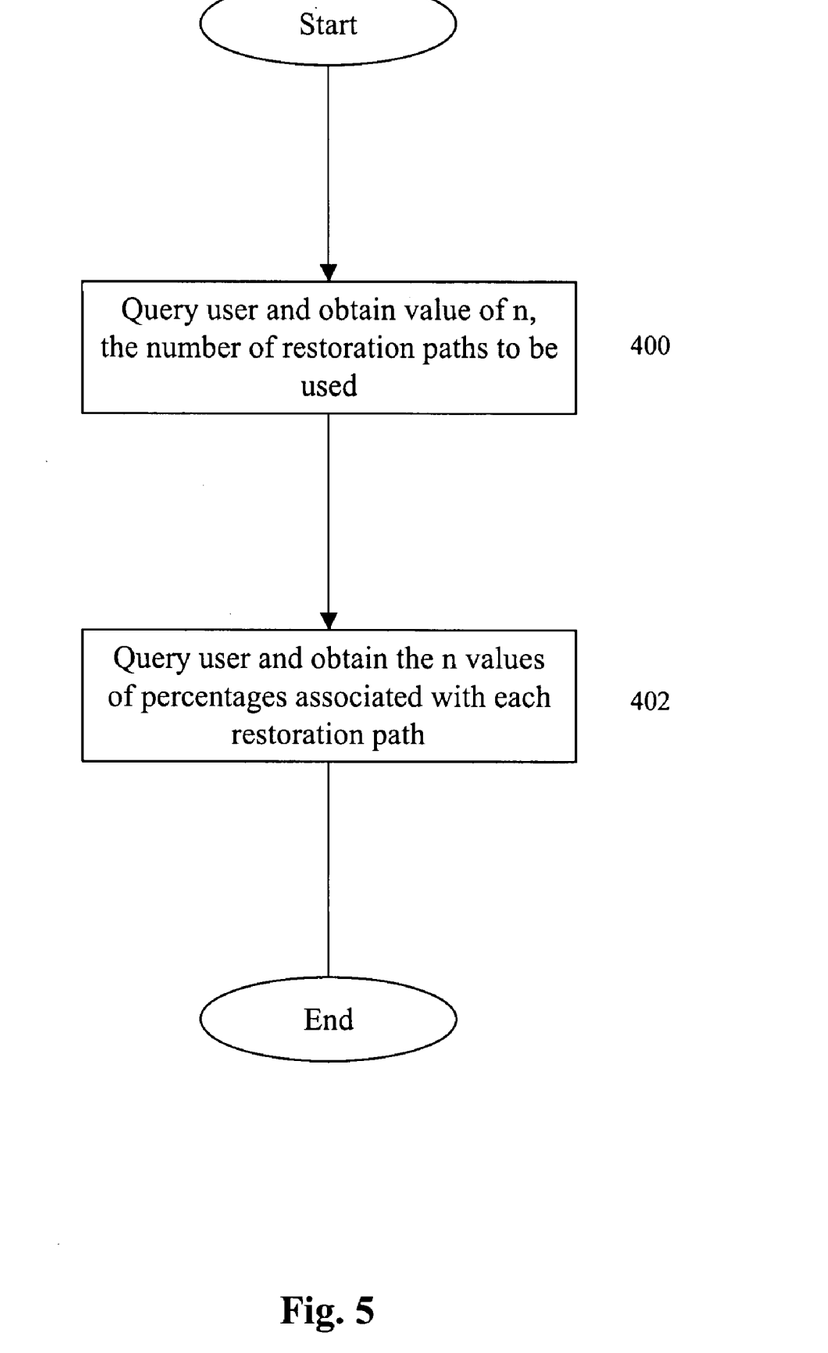
FIG. 5 is a flow diagram showing an exemplary sequence of steps for selecting parameters to estimate restoration capacity in accordance with the present invention.

FIG. 5 shows an exemplary sequence of steps for obtaining parameters from a user via queries. In step 400, the user is queried to obtain the desired number n of restoration paths to be used. In step 402, the user is queried to obtain the respective n percentages associated with each restoration path. For example, the user can set n=3 and p=(60%, 30%, 10%).

After obtaining the parameters, the system makes one pass through all connections. For each connection, n restoration paths are calculated. The first restoration path is maximally diverse from the service path. A maximally diverse path is calculated using the Dijkstra shortest path algorithm after setting some of the link weights of the links in the service path to an arbitrarily high value. The second restoration path is maximally diverse from both the service and the first restoration paths, and so on. The link weights used to ensure maximal diversity are typically different for the service path and the restoration paths. The weights, e.g., M and M1 in FIG. 6, can be set to large values relative to the weights of the links with M1<M. For example, M can be 100 times the sum of all link weights and M1 can be ten times the sum of all link weights. It is understood that paths may have one or more links in common.

Figure 6:
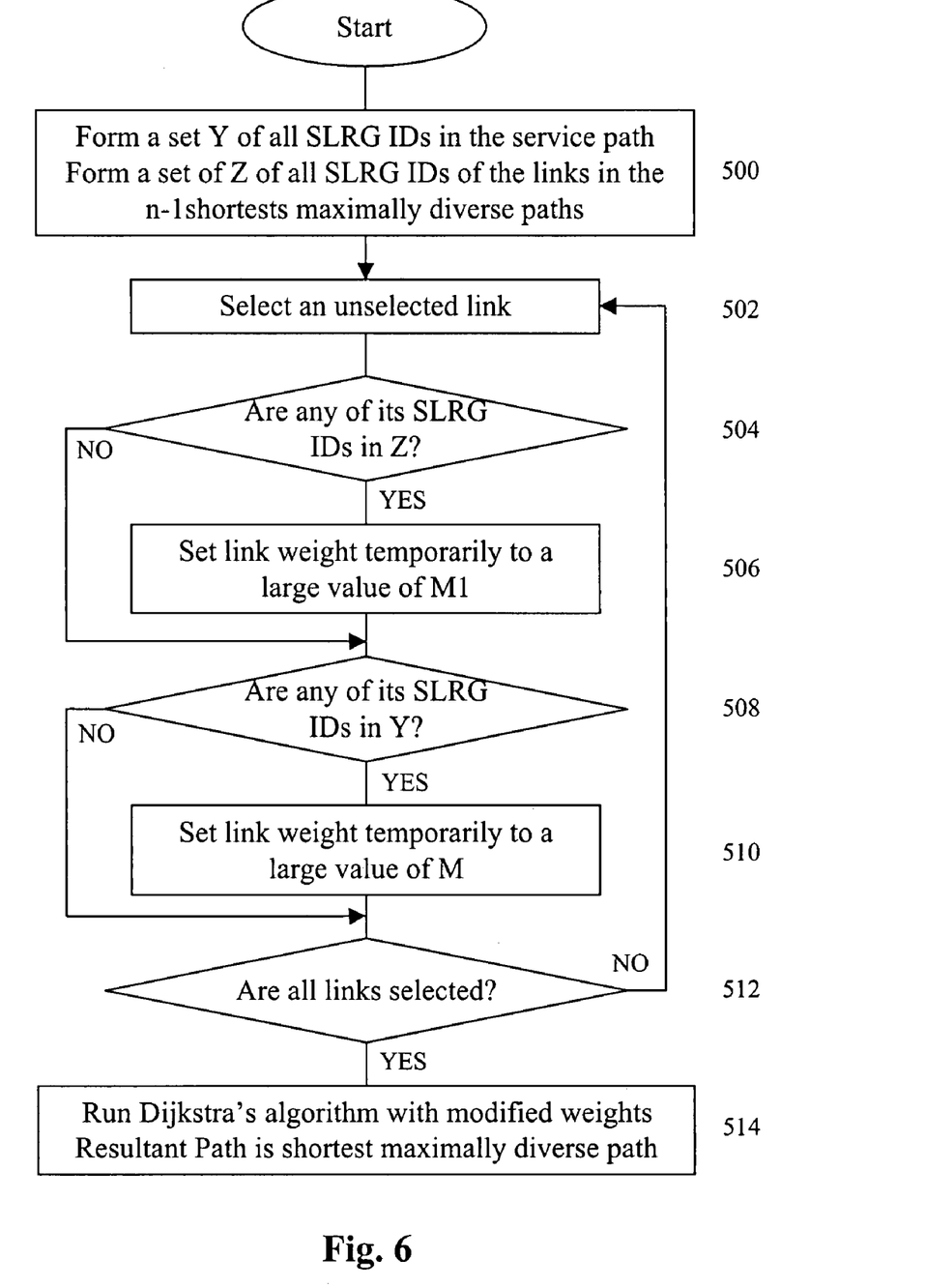
FIG. 6 is a flow diagram showing an exemplary sequence of steps for determining an nth shortest maximally diverse path in accordance with the present invention.

FIG. 6 shows an exemplary sequence of steps for determining the nth shortest maximally diverse path for a circuit. It is understood that the result obtained in FIG. 6 can be used in the steps shown in FIG. 7 below. In step 500, a set Y is formed of all SLRG IDs of the links in the service path of the circuit. A set Z is also formed of all SLRG IDs of the links in the n−1 shortest maximally diverse paths of this circuit. In step 502, an unselected link is selected from the entire set of links and in step 504 it is determined whether any of the selected link's SLRG IDs are contained in the set Z. If so, in step 506, the link weight is set temporarily to a large value M1, followed by step 508. If not, in step 508 it is determined whether any of the link SLRG IDs are in set Y. If so, in step 510 the link weight is set temporarily to a large value M. In step 512 it is determined whether all links are selected. If not, processing continues in step 502. If so, Dijkstra's algorithm is run with the modified weights in step 514 and resulting path is the shortest maximally diverse path.

Combining the steps of FIG. 6 above and the network of FIG. 1, it can be seen that the service route 301 includes links 203, 204, 205. The sum of the link weights=135, and therefore, M=13,500 and M1=1,350.

Table 1A below shows SLRG ID and weighting M, M1 for finding the first shortest maximally diverse path, where initially set Y={3, 4, 5, 8} and set Z=null set.

Table 1A First shortest maximally diverse path information.

TABLE 1

First shortest maximally diverse path information

| Link | SLRG IDs | Original Weight | Modified Weight |
|---|---|---|---|
| 201 | 1 | 10 | 10 |
| 202 | 2, 8 | 20 | 13,500 |
| 203 | 3 | 10 | 13,500 |
| 204 | 4 | 15 | 13,500 |
| 205 | 5, 8 | 20 | 13,500 |
| 206 | 6, 8, 9 | 30 | 13,500 |
| 207 | 7 | 30 | 30 |

The result of the Dijkstra algorithm provides the first shortest maximally diverse path of links 201, 202 or path 302 shown in FIG. 1.

Table 2 below shows SLRG ID and weighting information for the second shortest maximally diverse path, where initially set Y={3, 4, 5, 8} and set Z={1, 2, 8}.

TABLE 2

Second shortest maximally diverse path information

| Link | SLRG IDs | Original Weight | Modified Weight |
|---|---|---|---|
| 201 | 1 | 10 | 1,350 |
| 202 | 2, 8 | 20 | 13,500 |
| 203 | 3 | 10 | 13,500 |
| 204 | 4 | 15 | 13,500 |
| 205 | 5, 8 | 20 | 13,500 |
| 206 | 6, 8, 9 | 30 | 13,500 |
| 207 | 7 | 30 | 30 |

The result of the Dijkstra algorithm provides the second shortest maximally diverse path as links 206, 207 or path 303 shown in FIG. 1

Table 3 below shows SLRG ID and weighting information for the third shortest maximally diverse path, where initially set Y={3, 4, 5, 8} and set Z={1, 2, 6, 7, 8, 9}.

TABLE 3

Third shortest maximally diverse path information

| Link | SLRG IDs | Original Weight | Modified Weight |
|---|---|---|---|
| 201 | 1 | 10 | 1,350 |
| 202 | 2, 8 | 20 | 13,500 |
| 203 | 3 | 10 | 13,500 |
| 204 | 4 | 15 | 13,500 |
| 205 | 5, 8 | 20 | 13,500 |
| 206 | 6, 8, 9 | 30 | 13,500 |
| 207 | 7 | 30 | 1,350 |

The result of the Dijkstra algorithm provides the third shortest maximally diverse path as two candidates: paths 302 and 303 of FIG. 1. In one embodiment, this tie can be broken arbitrarily. Alternatively, n−1 large numbers used in FIG. 6 with number Mk associated with path k. The numbers could be increasing or decreasing with k and all must be less than M.

With the alternative (decreasing) approach, and M1=1, 350 and M2=1,340, the modified weight of link 7 will be 1,340 instead of 1,350 and the third shortest maximally diverse path will be path 303 with links 206, 207.

Figure 7:
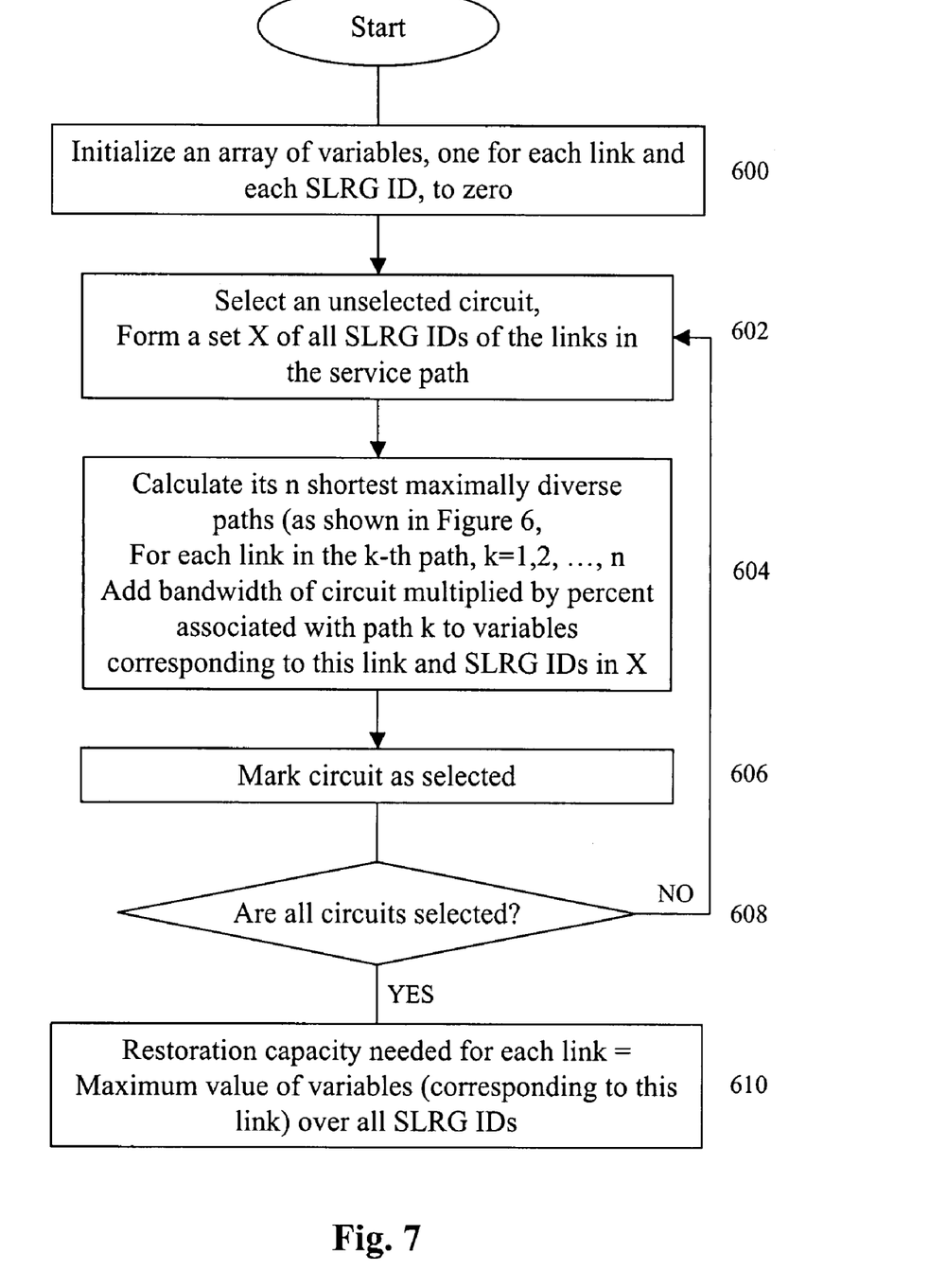
FIG. 7 is a flow diagram showing an exemplary sequence of steps for estimating restoration capacity in accordance with the present invention.

FIG. 7 shows an exemplary sequence of steps for estimating restoration capacity in accordance with the present invention. It is understood that the FIG. 7 may rely upon information, e.g., maximally diverse path calculations, obtained from FIG. 5 and/or FIG. 6. It is also understood that reference numbers may refer to network elements shown in FIG. 1.

In step 600, an array of variables is initialized to zero. One dimension of the array corresponds to links in the network, and the other dimension to SLRG ID values used in the network. In step 602, an unselected circuit is selected and a set X is formed of all SLRG IDs of the links in its service path. The n shortest maximally diverse paths are calculated (see e.g., FIG. 6) in step 604. For each link in the kth path, where k=1, 2, . . . , n, bandwidth of the circuit is added to the calculated result of the selected capacity percentage multiplied by the circuit bandwidth. For example, for one maximally diverse path for links 206 and 207, where the circuit bandwidth is ten and the capacity percentage is 30%, the bandwidth is three. For another maximally diverse path for links 206 and 207, where the capacity percentage is 10%, the bandwidth is four, i.e., one added to the three from the other path. In step 606, the circuit is marked as selected and in step 608 it is determined whether all circuits are selected. If not, processing continues in step 602. If so, in step 610 the restoration capacity need for each link is determined as the maximum value of variables corresponding to the link over all SLRG IDs.

The exemplary network shown in FIG. 1 can be used to show illustrative processing for the steps of FIG. 7. The service route 301 consists of links 203, 204, 205 and the circuit bandwidth=10. The variables include w[# links][# SLRG IDs], which are all initialized to zero. Set X={3, 4, 5, 8}.

The first shortest maximally diverse path=links 201, 202 with capacity percentage=60%, where capacity pct*circuit bandwidth=6, so that:

| W[201][3] = 6 | W[201][4] = 6 | W[201][5] = 6 | W[201][8] = 6 |
| W[202][3] = 6 | W[202][4] = 6 | W[202][5] = 6 | W[202][8] = 6 |

The second shortest maximally diverse path=links 206, 207 with capacity percentage=30%, where capacity pct*circuit bandwidth=3, so that:

| W[206][3] = 3 | W[206][4] = 3 | W[206][5] = 3 | W[206][8] = 3 |
| W[207][3] = 3 | W[207][4] = 3 | W[207][5] = 3 | W[207][8] = 3 |

The third shortest maximally diverse path=links 206, 207 with capacity percentage=10%, where capacity pct*circuit bandwidth=1 so that:

| W[206][3] = 4 | W[206][4] = 4 | W[206][5] = 4 | W[206][8] = 4 |
| W[207][3] = 4 | W[207][4] = 4 | W[207][5] = 4 | W[207][8] = 4 |

It is understood that this procedure is repeated for all circuits in the network.

Restoration capacity calculations for link j is the maximum of variables W[j][k] with k=1, 2, . . . , 9, as shown below in Table 4:

TABLE 4

| Restoration Capacity | |
|---|---|
| Link | Restoration Capacity |
| 201 | 6 |
| 202 | 6 |
| 203 | 0 |
| 204 | 0 |
| 205 | 0 |
| 206 | 4 |
| 207 | 4 |

With this arrangement, a user can trade off performance and cost. For better performance, the user needs to use fewer paths and put more capacity on the first path. For a lower overall capacity requirement, the user has to better share the restoration capacity between unrelated failures. This equates to longer restoration paths (higher value of n in the inventive method) and more of the restoration capacity put on longer paths.

The pre-calculated restoration path used in the switches can be enhanced to not always pick the shortest maximally diverse path but to probabilistically pick from one of n shortest maximally diverse paths with probabilities of selection p=(p1, p2, . . . , pn). This reduces the chance that all failed circuits between a pair of nodes target the same path, as it may not have sufficient capacity to restore all circuits.

Figure 8:
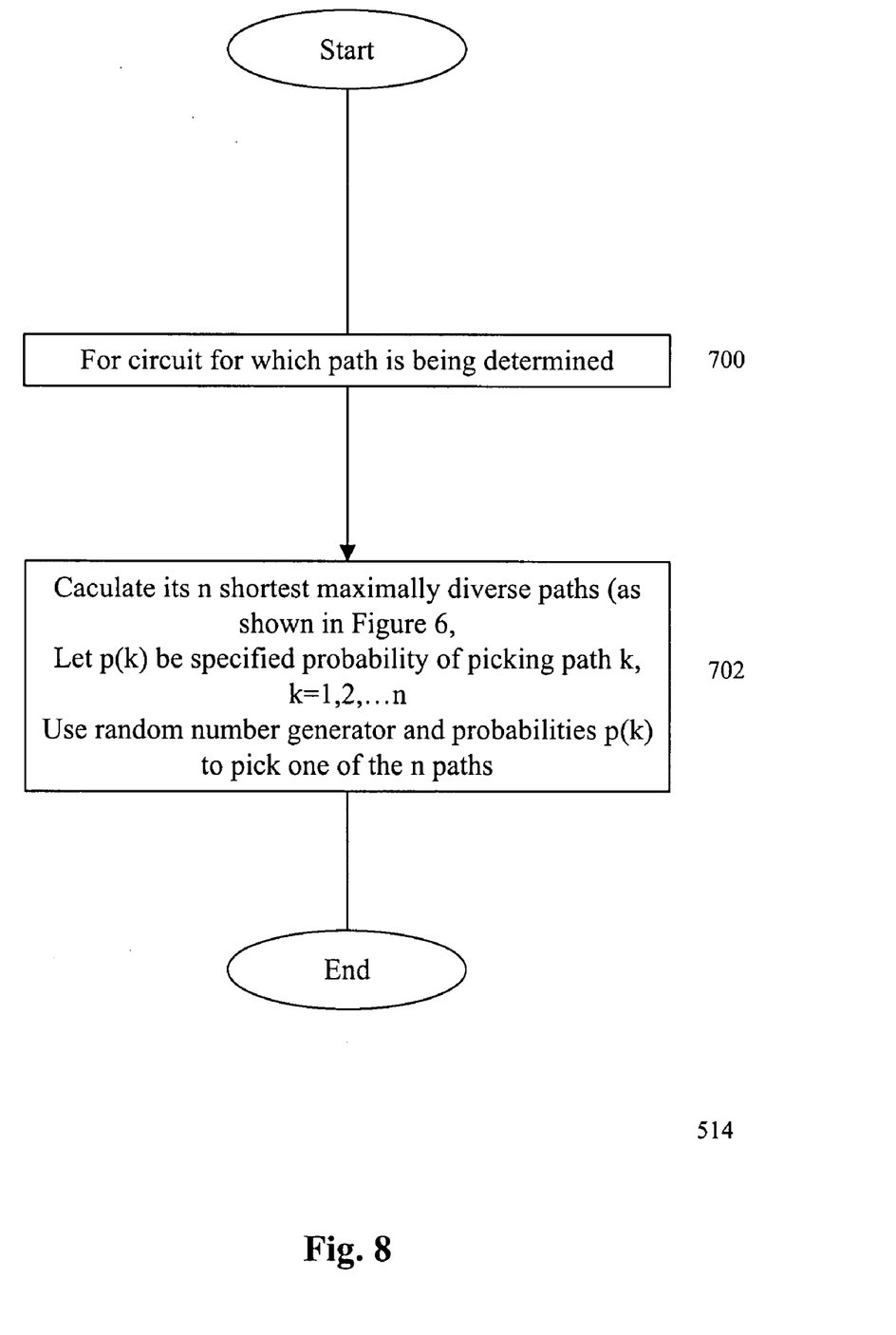
FIG. 8 is a flow diagram showing an exemplary sequence of steps for selecting pre-calculated restoration paths in accordance with the present invention.

FIG. 8 shows an exemplary sequence of steps to select pre-calculated restoration paths. In step 700, a first circuit for a given path is selected. In step 702, the n shortest maximally diverse paths are calculated for the circuit, as shown in FIG. 6 for example. In one embodiment, let p(k) be the probability of selecting path k, where k=1, 2, . . . n. A random number generator is then used in combination with the probabilities p(k) to select one of the n paths.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of estimating restoration capacity in a network, comprising:
    identifying a circuit in the network;
    obtaining a desired number of restoration paths for the circuit;
    based upon the desired number of restoration paths for the circuit, determining the restoration paths using a Dijkstra shortest path algorithm, the restoration paths calculated based upon a user provided percentage of restoration capacity to be deployed on each of the restoration paths;

for each link of restoration path, setting a link weight to first high value if a Shared Link Resource Group ID (SLRG ID) of the link is common with SLRG IDs of links in a corresponding shortest maximally diverse path, and if the link weight was not set to the first high value, for each link, setting the link weight to a second high value if any of the SLRG IDs for the link are common with SLRG IDs of links in the circuit.

2. The method according to claim 1, further including running Dijkstra's algorithm.

* * * * *